US010841547B2

(12) United States Patent
Kuo et al.

(10) Patent No.: US 10,841,547 B2
(45) Date of Patent: Nov. 17, 2020

(54) METHOD FOR FABRICATING SMALL RIGHT ANGLE PRISM MIRRORS INVOLVING 3D SHAPE ON OPTICAL GLUE LAYER

(71) Applicant: HIMAX TECHNOLOGIES LIMITED, Tainan (TW)

(72) Inventors: Han-Yi Kuo, Tainan (TW); Yin-Dong Lu, Tainan (TW); Shi-Jen Wu, Tainan (TW); Chih-Sheng Chang, Tainan (TW); Teng-Te Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 412 days.

(21) Appl. No.: 15/866,436

(22) Filed: Jan. 9, 2018

(65) Prior Publication Data
US 2019/0215499 A1 Jul. 11, 2019

(51) Int. Cl.
*G01J 1/04* (2006.01)
*G02B 5/04* (2006.01)
(Continued)

(52) U.S. Cl.
CPC .......... *H04N 9/3147* (2013.01); *G01J 1/0477* (2013.01); *G02B 5/04* (2013.01);
(Continued)

(58) Field of Classification Search
CPC ........ B05D 5/063; B05D 5/067; B05D 5/068; G02B 5/04; G02B 5/045; G02B 5/124;
(Continued)

(56) References Cited

U.S. PATENT DOCUMENTS 7,842,154 B2 * 11/2010 Lynam ...................... B60R 1/08
156/242
10,409,078 B2 * 9/2019 Deng ............... B29D 11/00932
(Continued)

FOREIGN PATENT DOCUMENTS

| CN | 101282837 A | 10/2008 |
| TW | 201409085 A | 3/2014 |
| TW | 201723629 A | 7/2017 |

OTHER PUBLICATIONS

Baranski et al., "Wafer-Level Fabrication of Microcube-Typed Beam-Splitters by Saw-Dicing of Glass Substrate", IEEE Photonics Technology Letters, vol. 26, No. 1, Jan. 1, 2014 (Year: 2014).*

*Primary Examiner* — Ryan S Dunning
(74) *Attorney, Agent, or Firm* — Winston Hsu

(57) ABSTRACT

The present invention provides a method for fabricating small right angle prism mirrors, projecting system, and small right angle prism mirrors fabricated by a semiconductor process. The method comprises: coating a reflecting layer on a top surface of a glass substrate; forming an optical glue layer on a bottom surface of the glass substrate; utilizing a mold to form a 3D shape on the optical glue layer; exposing the optical glue layer having the 3D shape to solidify the optical glue layer having the 3D shape and combine the glass substrate having the reflecting layer and the optical glue layer having the 3D shape; removing the mold to form a small prism array; and dicing the small prism array to generate a plurality of small right angle prism mirrors.

6 Claims, 16 Drawing Sheets

(51) Int. Cl.
*G02B 27/10* (2006.01)
*G03B 21/28* (2006.01)
*H04N 5/74* (2006.01)
*H04N 9/31* (2006.01)
*B05D 5/06* (2006.01)
*G02B 5/124* (2006.01)
*G02B 7/18* (2006.01)

(52) U.S. Cl.
CPC ......... *G02B 27/1073* (2013.01); *G03B 21/28* (2013.01); *H04N 5/7458* (2013.01); *H04N 9/315* (2013.01); *H04N 9/3161* (2013.01); *H04N 9/3173* (2013.01); *B05D 5/063* (2013.01); *G02B 5/045* (2013.01); *G02B 5/124* (2013.01); *G02B 7/1805* (2013.01)

(58) Field of Classification Search
CPC ........ G02B 6/4214; G02B 2006/12114; G02B 7/1805; G02B 17/002; G02B 26/0883; G11B 7/1359; H01S 5/0201; H01S 5/0202; H01S 5/02248; H01S 5/02252; H01S 5/02292
USPC .................................. 359/833, 834
See application file for complete search history.

(56) References Cited

U.S. PATENT DOCUMENTS

2016/0025932 A1  1/2016  Shi
2016/0216524 A1* 7/2016  Deng ................... G02B 27/126

* cited by examiner

METHOD FOR FABRICATING SMALL RIGHT ANGLE PRISM MIRRORS INVOLVING 3D SHAPE ON OPTICAL GLUE LAYER

BACKGROUND OF THE INVENTION

1. Field of the Invention

The present invention relates to a method for fabricating right angle prism mirrors, and more particularly, to a method for fabricating small right angle prism mirrors, projecting system, and small right angle prism mirrors fabricated by a semiconductor process.

2. Description of the Prior Art

In general, a conventional method of fabricating a right angle prism mirror is performed by cutting, polishing, and grinding a glass surface to attain a required optical quality. However, when an optical system such as a small projecting system (e.g. portable projecting device) needs a very small reflective surface, it is very difficult for the conventional method to fabricate right angle prism mirrors having very small sizes and required optical quality without high cost.

SUMMARY OF THE INVENTION

It is therefore one of the objectives of the present invention to provide a method for fabricating small right angle prism mirrors, projecting system, and small right angle prism mirrors fabricated by a semiconductor process, so as to solve the above problem.

In accordance with an embodiment of the present invention, a method for fabricating small right angle prism mirrors is disclosed. The method comprises: coating a reflecting layer on a top surface of a glass substrate; forming an optical glue layer on a bottom surface of the glass substrate; utilizing a mold to form a 3D shape on the optical glue layer; exposing the optical glue layer having the 3D shape to solidify the optical glue layer having the 3D shape and combine the glass substrate having the reflecting layer and the optical glue layer having the 3D shape; removing the mold to form a small prism array; and dicing the small prism array to generate a plurality of small right angle prism mirrors.

In accordance with an embodiment of the present invention, a small right angle prism mirror is disclosed. The small right angle prism mirror comprises: a solidified optical glue layer, a glass substrate, and a reflecting layer. The solidified optical glue layer has a 3D shape with a bottom surface for fixed on a substrate of an electronic system. The glass substrate is disposed on the solidified optical glue layer. The reflecting layer is disposed on the glass substrate, and utilized for reflecting a light from a light source.

In accordance with an embodiment of the present invention, a method for fabricating small right angle prism mirrors is disclosed. The method comprises: forming an optical glue layer on a glass substrate; utilizing a mold to form a 3D shape on the optical glue layer; exposing the optical glue layer having the 3D shape to solidify the optical glue layer having the 3D shape and combine the glass substrate having the reflecting layer and the optical glue layer having the 3D shape; removing the mold to form a small prism array; coating a reflecting layer on a top surface of the small prism array; and dicing the small prism array having the reflecting layer to generate a plurality of small right angle prism mirrors.

In accordance with an embodiment of the present invention, a small right angle prism mirror is disclosed. The small right angle prism mirror comprises: a glass substrate, a solidified optical glue layer and a reflecting layer. The glass substrate is utilized for fixed on a substrate of an electronic system. The solidified optical glue layer is disposed on the glass substrate, and has a 3D shape. The reflecting layer is disposed on a top surface of the solidified optical glue layer, and has a specific inclined plane for reflecting a light from a light source.

In accordance with an embodiment of the present invention, a projecting system is disclosed. The projecting system comprises: a substrate, a light source, and a small right angle prism mirror. The light source is disposed on the substrate, and utilized for emitting a light. The small right angle prism mirror is disposed on the substrate, and comprises a solidified optical glue layer, a glass substrate and a reflecting layer.

Briefly summarized, the present invention can use a semiconductor process such as an imprint process to fabricate the right angle prism mirrors having very small sizes and high quality without high cost, and apply the small right angle prism mirrors in the projecting system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 1:
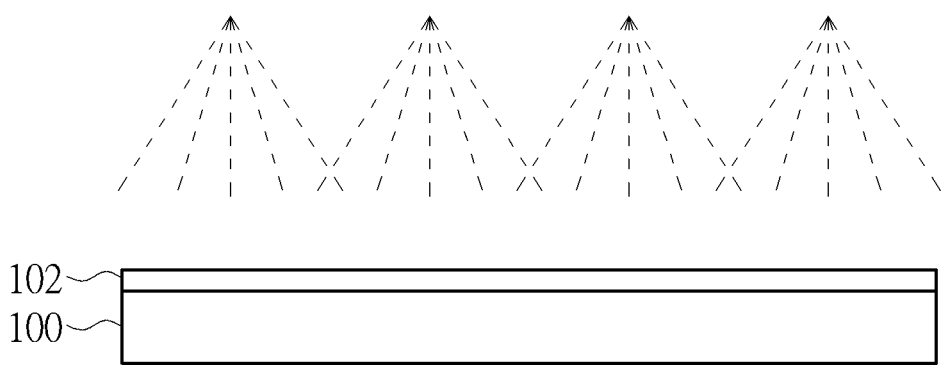
FIGS. 1-6 are sectional diagrams illustrating sequential procedures of a method for fabricating small right angle prism mirrors in accordance with a first embodiment of the present invention.

Please refer to FIGS. 1-6. FIGS. 1-6 are sectional diagrams illustrating sequential procedures of a method for fabricating small right angle prism mirrors in accordance with a first embodiment of the present invention, wherein the small right angle prism mirrors can be utilized in an electronic system such as a small projector (e.g. portable projecting device). As shown in FIG. 1, a first step of the method in the present invention is coating a reflecting layer 102 on a top surface of a glass substrate 100, wherein the glass substrate 100 can be an optical wafer, and the reflecting layer 102 can be a mirror layer.

Figure 2:
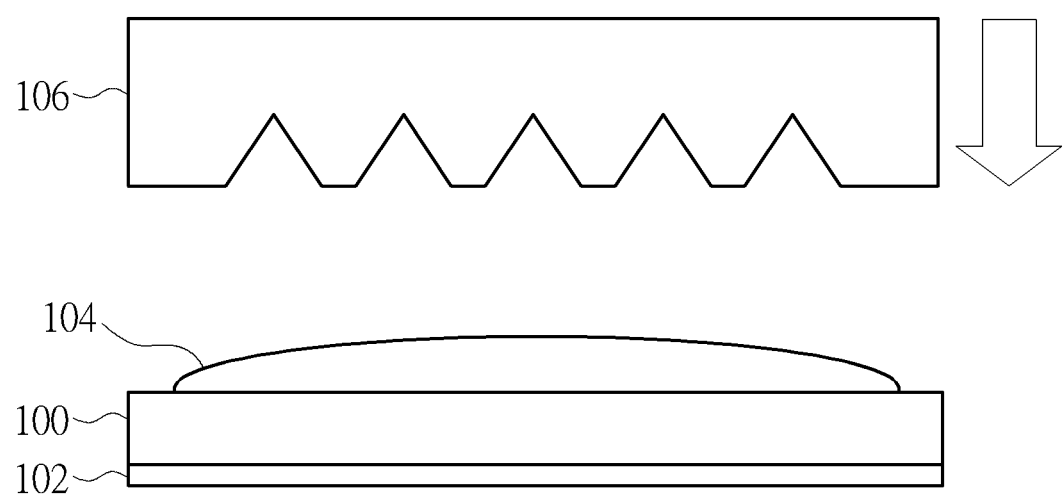

Next, as shown in FIG. 2, a second step of the method in the present invention is flipping the glass substrate 100 and forming an optical glue layer 104 on a bottom surface of the glass substrate 100, and providing a mold 106, wherein the mold 106 can be a soft mold.

Figure 3:
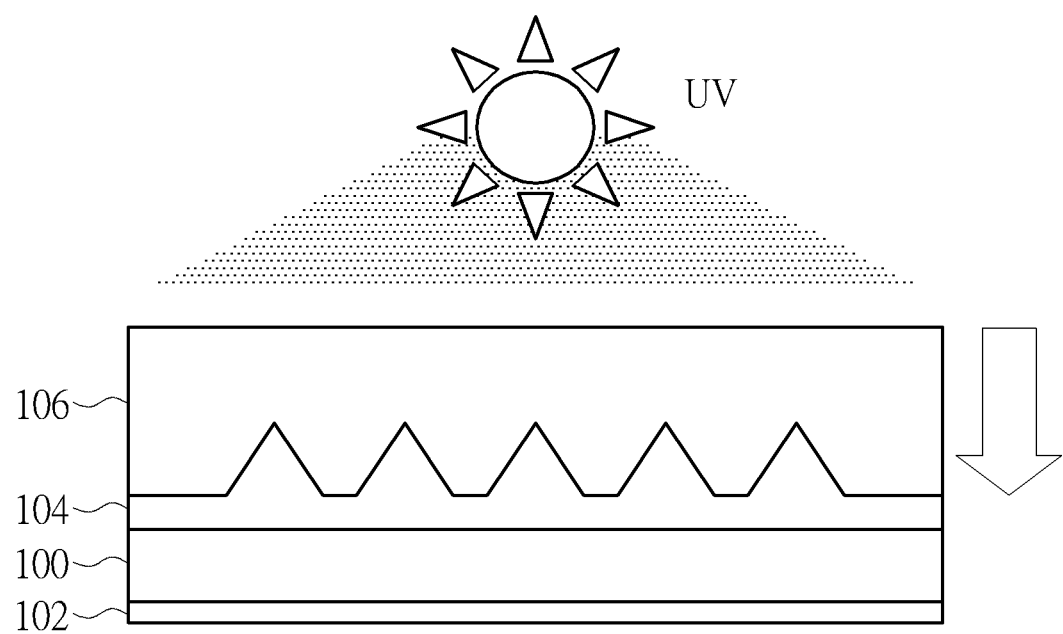

Next, as shown in FIG. 3, a third step of the method in the present invention is utilizing the mold 106 to form a 3D shape on the optical glue layer 104 and exposing the optical glue layer 104 having the 3D shape to solidify the optical glue layer 104 having the 3D shape and combine the glass substrate 100 having the reflecting layer 102 and the optical glue layer 104 having the 3D shape by using an ultraviolet (UV) light, wherein the optical glue layer comprises a UV glue material. In addition, the 3D shape can comprise a plurality of triangular prisms or a plurality of pyramids, wherein the pyramids can be triangular pyramids, square based pyramids, pentagonal pyramids, or hexagonal pyramids, etc.

Figure 4:
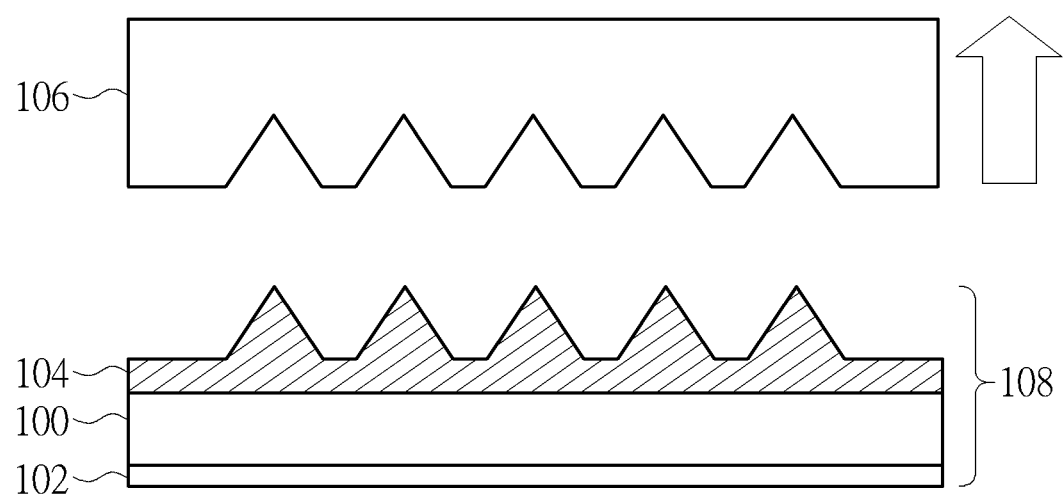
Figure 5:
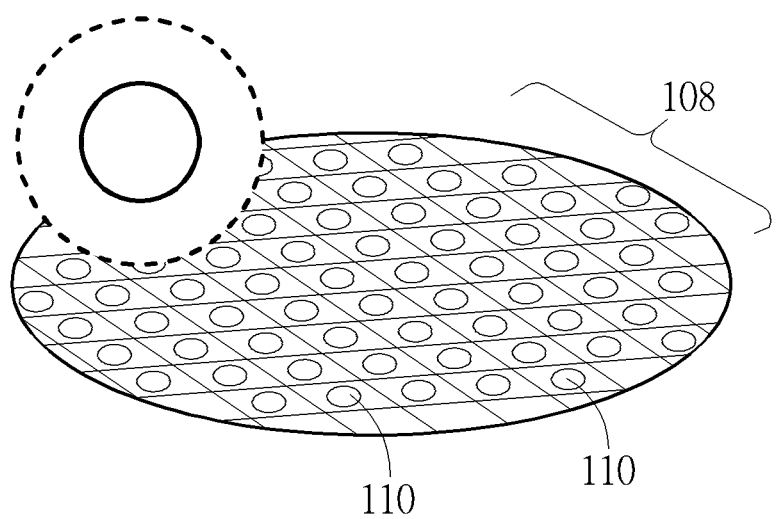
Figure 6:
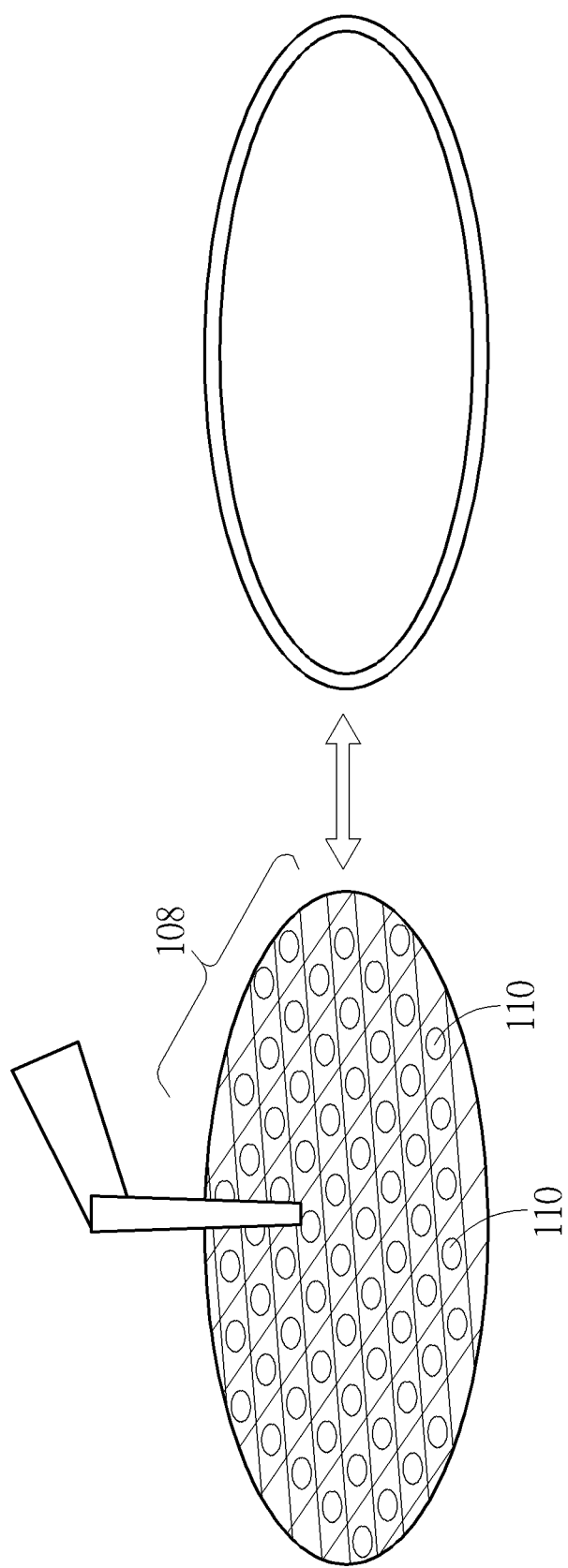

Next, as shown in FIG. 4, a fourth step of the method in the present invention is removing the mold 106 to form a small prism array 108. Next, as shown in FIG. 5, a fifth step of the method in the present invention is dicing the small prism array 108 to generate a plurality of small right angle prism mirrors 110. Finally, as shown in FIG. 6, the small right angle prism mirrors 110 can be picked and placed for assembling electronic systems such as small projectors.

Figure 7:
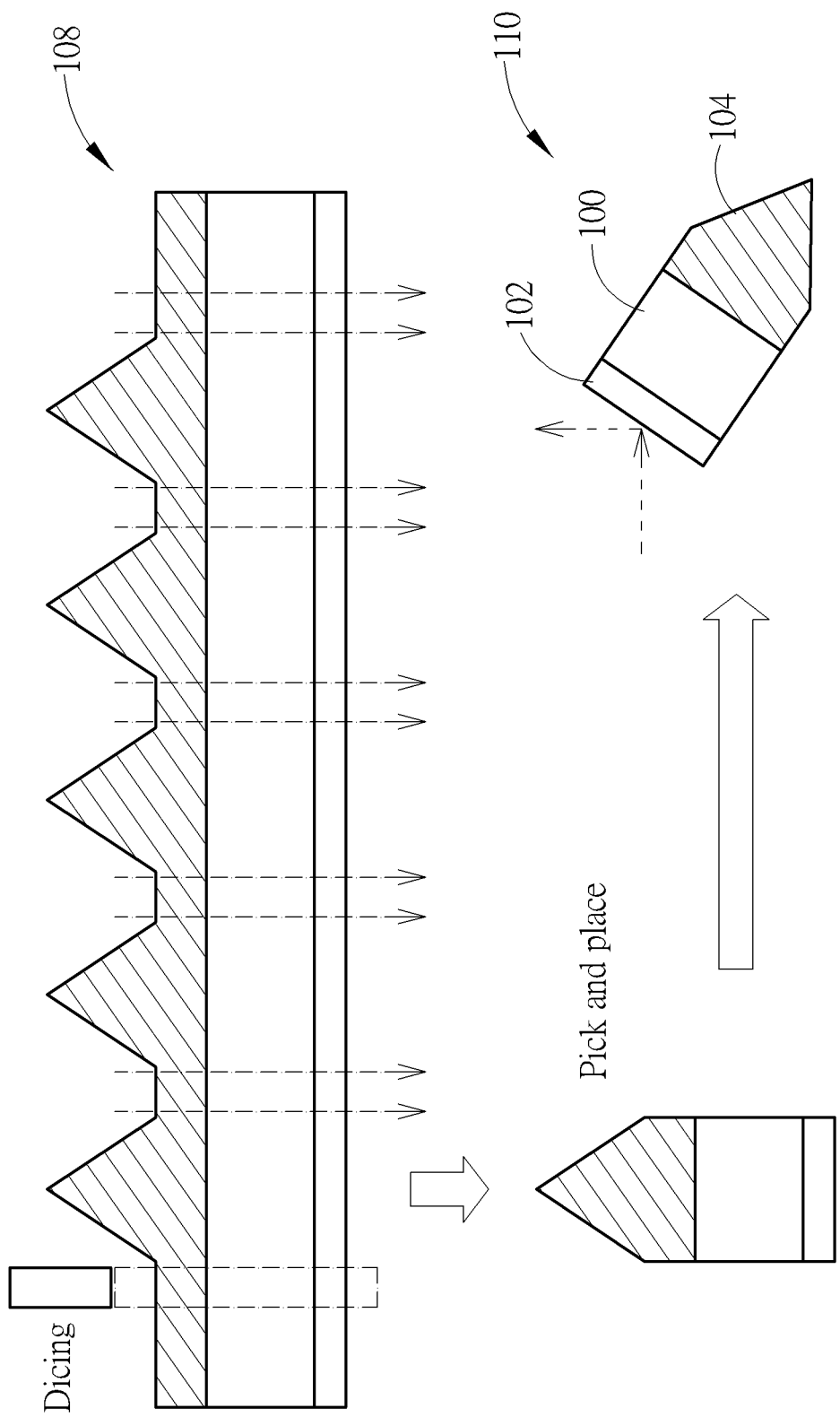
FIG. 7 is a simplified diagram showing how to dice the small prism array and place the small right angle prism mirrors in FIGS. 5-6 in accordance with an embodiment of the present invention.

In addition, please refer to FIG. 7. FIG. 7 is a simplified diagram showing how to dice the small prism array 108 and place the small right angle prism mirrors 110 in accordance with an embodiment of the present invention. In this way, the present invention can use a semiconductor process such as an imprint process to fabricate the right angle prism mirrors having very small sizes and high quality without high cost. Please note that the above embodiment is merely for an illustrative purpose and is not meant to be a limitation of the present invention. For example, the 3D shape of the optical glue layer 104 and the number of the small right angle prism mirrors 110 can be changed according to different design requirements.

Figure 8:
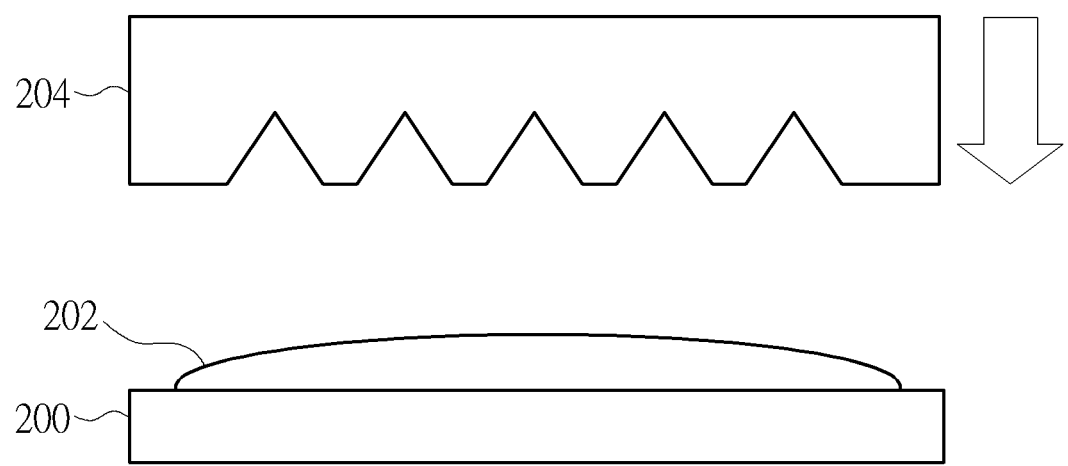
FIGS. 8-13 are sectional diagrams illustrating sequential procedures of a method for fabricating small right angle prism mirrors in accordance with a second embodiment of the present invention

Please refer to FIGS. 8-13. FIGS. 8-13 are sectional diagrams illustrating sequential procedures of a method for fabricating small right angle prism mirrors in accordance with a second embodiment of the present invention, wherein the small right angle prism mirrors can be utilized in an electronic system such as a small projector (e.g. portable projecting device). As shown in FIG. 8, a first step of the method in the present invention is forming an optical glue layer 202 on a glass substrate 200 forming an optical glue layer on a glass substrate, and providing a mold 204, wherein the glass substrate 200 can be an optical wafer and the mold 204 can be a soft mold.

Figure 9:
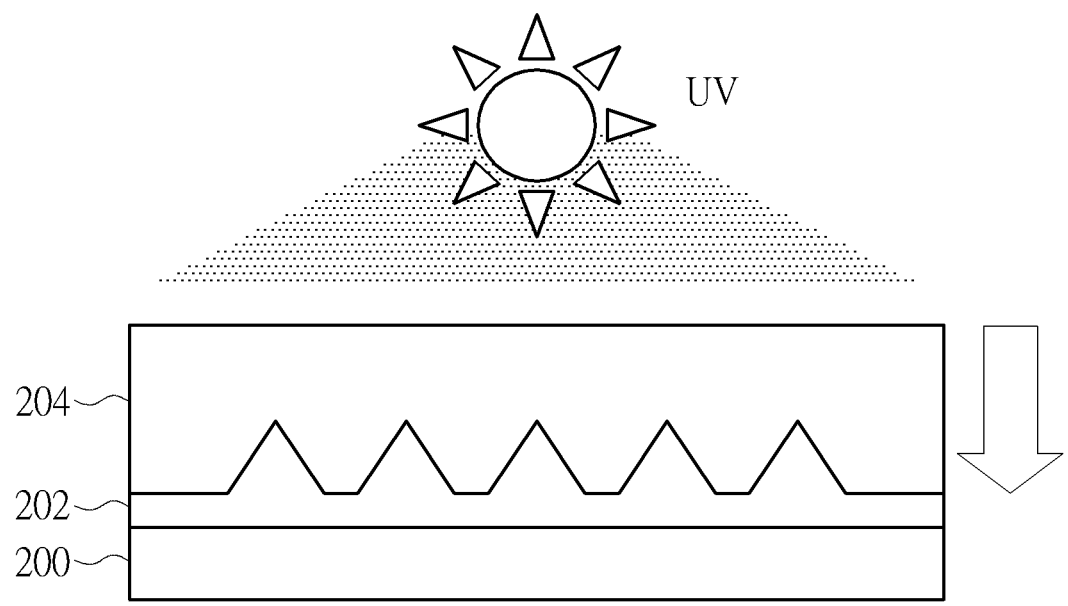

Next, as shown in FIG. 9, a second step of the method in the present invention is utilizing the mold 204 to form a 3D shape on the optical glue layer 202 and exposing the optical glue layer 202 having the 3D shape to solidify the optical glue layer 202 having the 3D shape and combine the glass substrate 200 having the reflecting layer 208 and the optical glue layer 202 having the 3D shape by using an ultraviolet (UV) light, wherein the optical glue layer comprises a UV glue material. In addition, the 3D shape can comprise a plurality of triangular prisms or a plurality of pyramids, wherein the pyramids can be triangular pyramids, square based pyramids, pentagonal pyramids, or hexagonal pyramids, etc.

Figure 10:
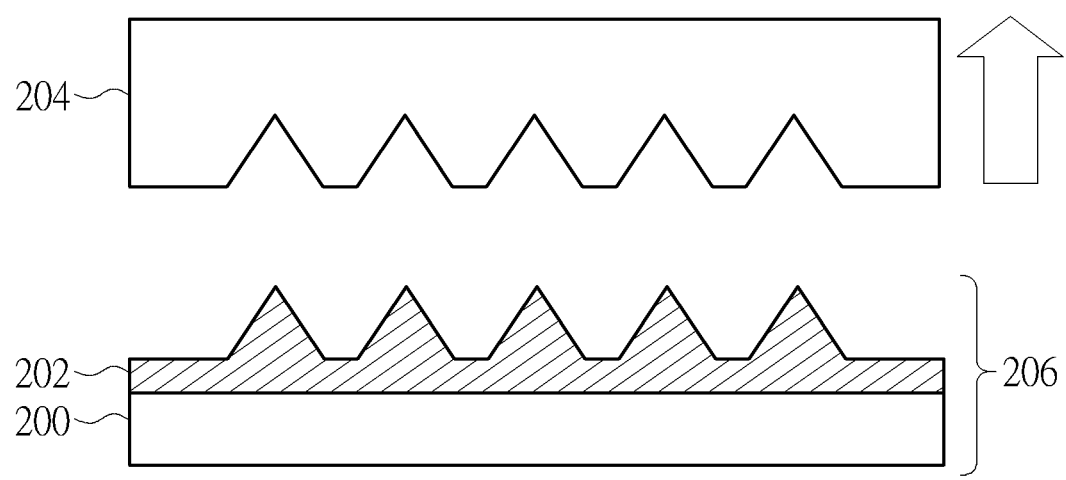
Figure 11:
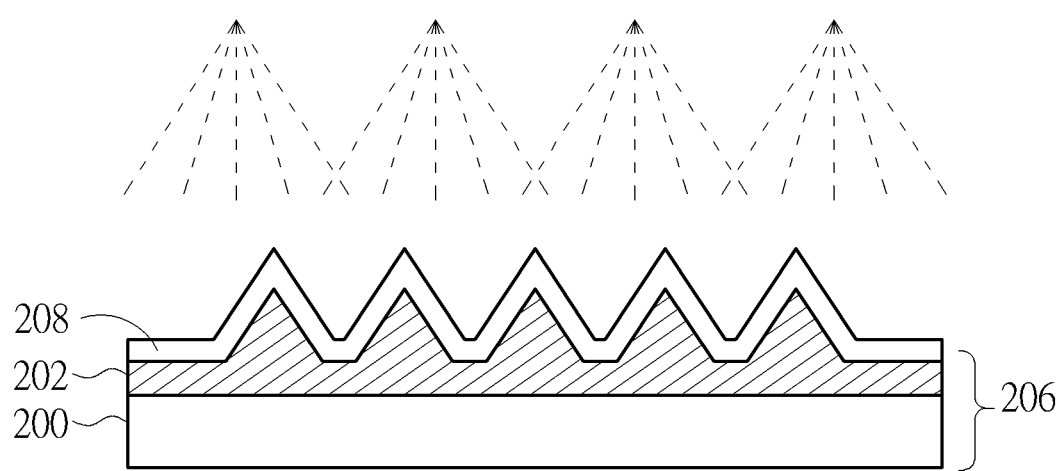

Next, as shown in FIG. 10, a third step of the method in the present invention is removing the mold 204 to form a small prism array 206. Next, as shown in FIG. 11, a fourth step of the method in the present invention is coating a reflecting layer 208 on a top surface of the small prism array 206, wherein the reflecting layer 208 can be a mirror layer.

Figure 12:
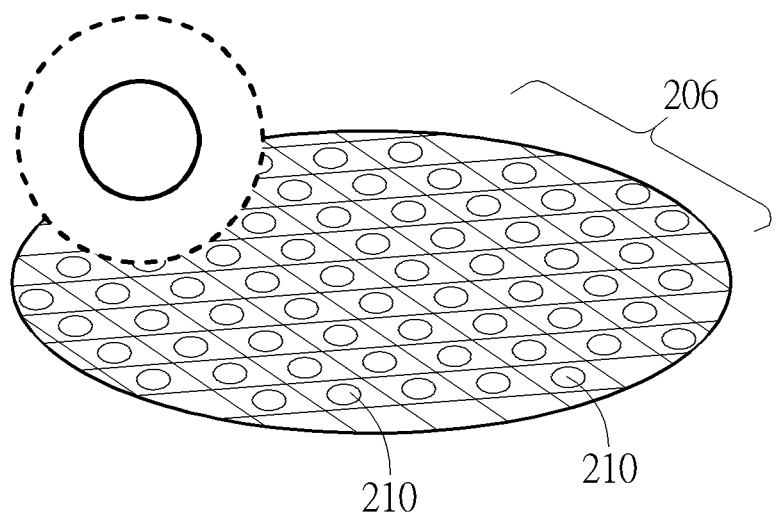
Figure 13:
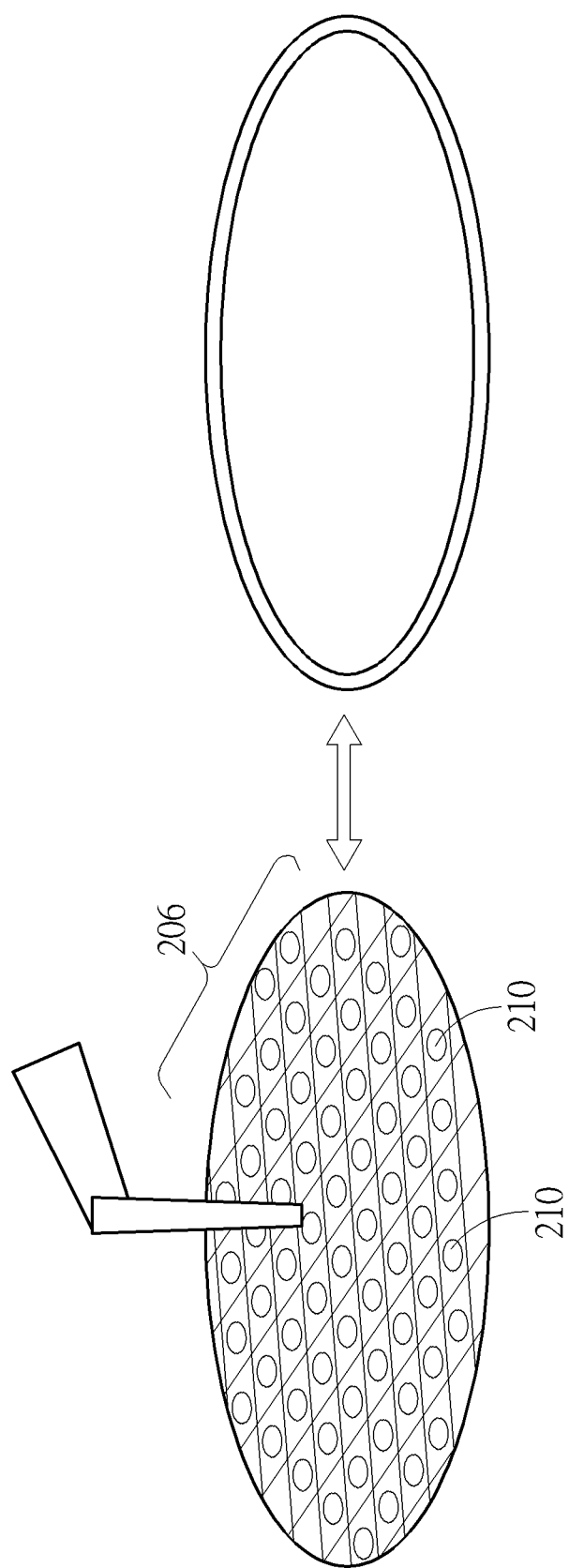

Next, as shown in FIG. 12, a fifth step of the method in the present invention is dicing the small prism array 206 having the reflecting layer 208 to generate a plurality of small right angle prism mirrors 210. Finally, as shown in FIG. 13, the small right angle prism mirrors 210 can be picked and placed for assembling electronic systems such as small projectors.

Figure 14:
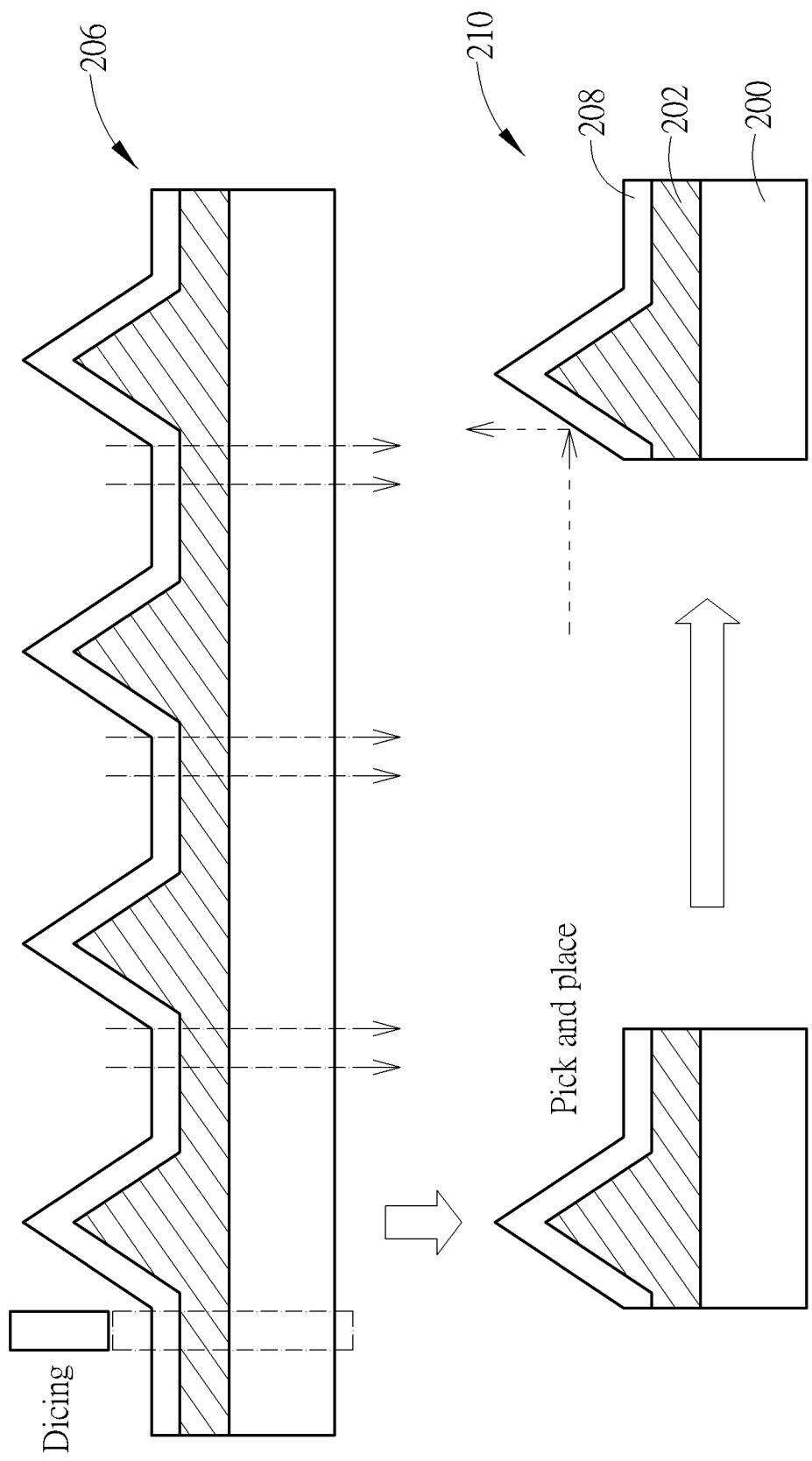
FIG. 14 is a simplified diagram showing how to dice the small prism array having the reflecting layer and place the small right angle prism mirrors in FIGS. 12-13 in accordance with an embodiment of the present invention.

In addition, please refer to FIG. 14. FIG. 14 is a simplified diagram showing how to dice the small prism array 206 having the reflecting layer 208 and place the small right angle prism mirrors 210 in accordance with an embodiment of the present invention. In this way, the present invention can use a semiconductor process such as an imprint process to fabricate the right angle prism mirrors having very small sizes and high quality without high cost. Please note that the above embodiment is merely for an illustrative purpose and is not meant to be a limitation of the present invention. For example, the 3D shape of the optical glue layer 202 and the number of the small right angle prism mirrors 210 can be changed according to different design requirements.

Figure 15:
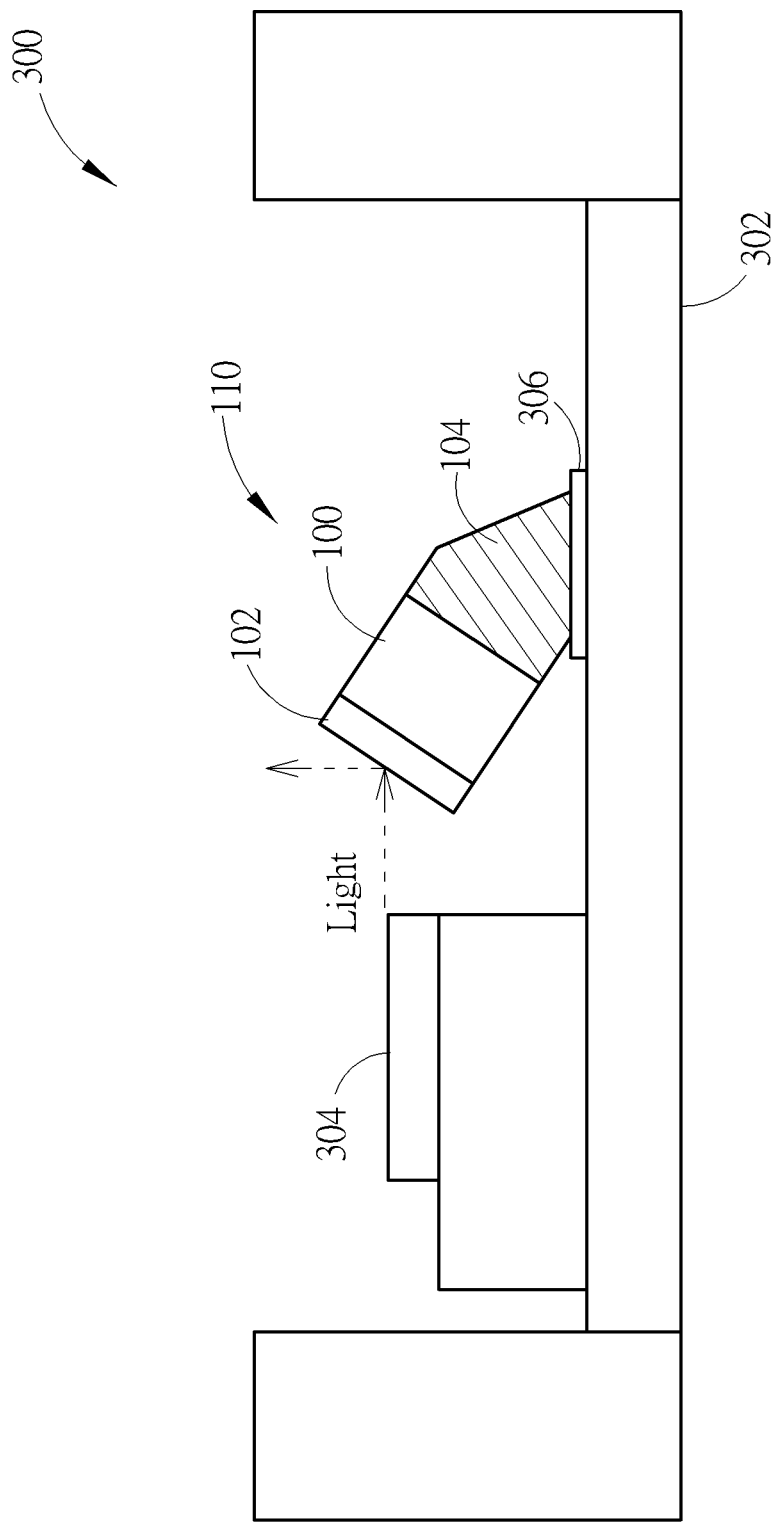
FIG. 15 is a simplified diagram of a projecting system in accordance with an embodiment of the present invention.
Figure 16:
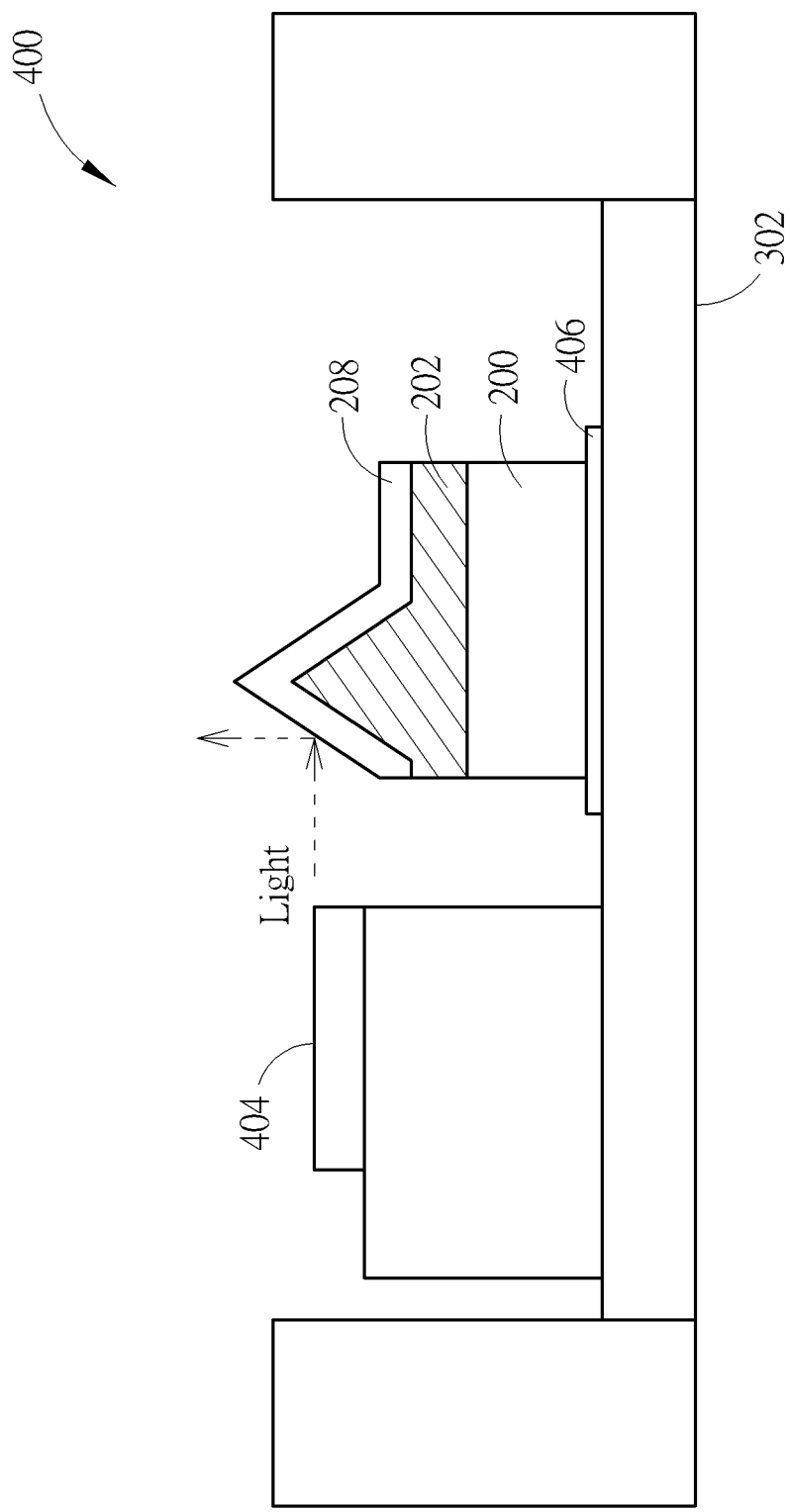
FIG. 16 is a simplified diagram of a projecting system in accordance with another embodiment of the present invention.

Please refer to FIG. 15 and FIG. 16. FIG. 15 is a simplified diagram of a projecting system 300 in accordance with an embodiment of the present invention. FIG. 16 is a simplified diagram of a projecting system 400 in accordance with another embodiment of the present invention, wherein the projecting systems 300 and 400 can be small projectors (e.g. portable projecting devices). As shown in FIG. 15, the projecting system 300 comprises: a substrate 302, a light source 304, and a small right angle prism mirror 110 mentioned above. The light source 304 is disposed on the substrate 302, and utilized for emitting a light, wherein the light source 304 can be a laser. The small right angle prism mirror 110 is disposed on the substrate 302. The small right angle prism mirror 110 comprises: a solidified optical glue layer 104, a glass substrate 100, and a reflecting layer 102. The solidified optical glue layer 104 has a 3D shape with a bottom surface for fixed on the substrate 302, wherein there can be an adhesive layer 306 between the bottom surface of the 3D shape and the substrate 302. The glass substrate 100 is disposed on the solidified optical glue layer 104, and the reflecting layer 102 is disposed on the glass substrate 100, for reflecting the light from the light source 304.

As shown in FIG. 16, the projecting system 400 comprises: a substrate 402, a light source 404, and a small right angle prism mirror 210 mentioned above. The light source 404 is disposed on the substrate 402, and utilized for emitting a light, wherein the light source 404 can be a laser. The small right angle prism mirror 210 is disposed on the substrate 402. The small right angle prism mirror 210 comprises: a glass substrate 200, a solidified optical glue layer, 202 and a reflecting layer 208. The glass substrate 200 is utilized for fixed on the substrate 402, wherein there can be an adhesive layer 406 between the glass substrate 200 and the substrate 402. The solidified optical glue layer 202 is disposed on the glass substrate 200, and has a 3D shape. The reflecting layer 208 is disposed on a top surface of the solidified optical glue layer 202, and has a specific inclined plane for reflecting a light from the light source 404.

Briefly summarized, the present invention can use a semiconductor process such as an imprint process to fabricate the right angle prism mirrors having very small sizes and high quality without high cost, and apply the small right angle prism mirrors in the projecting system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating small right angle prism mirrors, comprising:
    coating a reflecting layer on a top surface of a glass substrate;
    forming an optical glue layer on a bottom surface of the glass substrate;
    utilizing a mold to form a 3D shape on the optical glue layer;
    exposing the optical glue layer having the 3D shape to solidify the optical glue layer having the 3D shape and combine the glass substrate having the reflecting layer and the optical glue layer having the 3D shape;
    removing the mold to form a small prism array; and
    dicing the small prism array to generate a plurality of small right angle prism mirrors;
    wherein the 3D shape comprises a plurality of triangular prisms or a plurality of pyramids.

2. The method of claim 1, wherein the glass substrate is an optical wafer.

3. The method of claim 1, wherein the optical glue layer comprises an ultraviolet (UV) glue material.

4. A method for fabricating small right angle prism mirrors, comprising:
    forming an optical glue layer on a glass substrate;
    utilizing a mold to form a 3D shape on the optical glue layer;
    exposing the optical glue layer having the 3D shape to solidify the optical glue layer having the 3D shape and combine the glass substrate having the reflecting layer and the optical glue layer having the 3D shape;
    removing the mold to form a small prism array;
    coating a reflecting layer on a top surface of the small prism array; and
    dicing the small prism array having the reflecting layer to generate a plurality of small right angle prism mirrors;
    wherein the 3D shape comprises a plurality of triangular prisms or a plurality of pyramids.

5. The method of claim 4, wherein the glass substrate is an optical wafer.

6. The method of claim 4, wherein the optical glue layer comprises a UV glue material.

* * * * *